United States Patent [19]

Skille

[11] Patent Number: 4,831,769
[45] Date of Patent: May 23, 1989

[54] DOWNRIGGER CONTROL BOARD

[75] Inventor: Gene L. Skille, Hayward, Wis.

[73] Assignee: Sween Corporation, Lake Crystal, Minn.

[21] Appl. No.: 129,244

[22] Filed: Dec. 7, 1987

[51] Int. Cl.$^4$ .............................................. A01K 93/00
[52] U.S. Cl. .................................................. 43/43.13
[58] Field of Search ....................................... 43/43.13

[56] References Cited

U.S. PATENT DOCUMENTS

| | | | |
|---|---|---|---|
| 2,273,209 | 2/1942 | Luthan | 43/43.13 |
| 3,401,477 | 9/1968 | Luketa | 43/43.13 |
| 3,908,300 | 9/1975 | Kuismi | 43/43.13 |
| 4,028,840 | 6/1977 | Wille | 43/43.13 |
| 4,045,901 | 9/1977 | Prudenzi | 43/43.13 |
| 4,128,959 | 12/1978 | Staaden | 43/43.13 |
| 4,161,841 | 7/1979 | Holstein | 43/43.13 |
| 4,255,890 | 3/1981 | Smith | 43/43.13 |
| 4,524,538 | 6/1985 | Halvorsen | 43/43.13 |

Primary Examiner—Kurt Rowan
Attorney, Agent, or Firm—Harold D. Jastram

[57] ABSTRACT

A downrigger control board having a substantially planar body with a curved tail portion for guiding the board through the water and including a mast mounted on the body at a predetermined location between a nose portion and tail portion of the body and with a cross arm mounted on the mast to engage a downrigger cable to guide the dowrigger cable away from the side of a fishing boat as the fishing boat drags a weighted downrigger cable through the water with an attached fishing line.

15 Claims, 2 Drawing Sheets

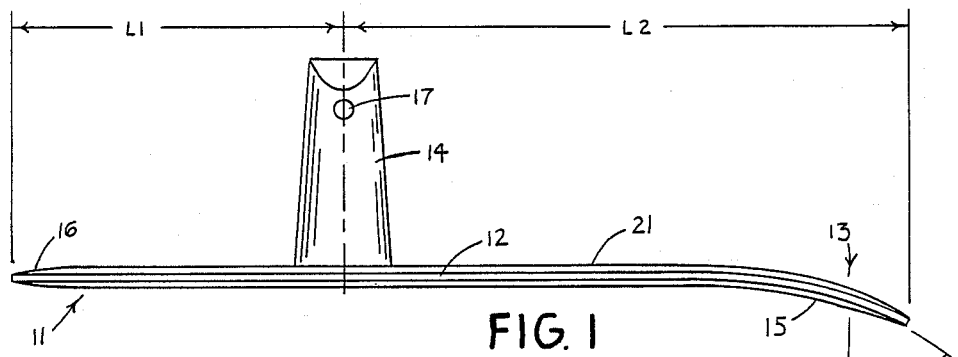
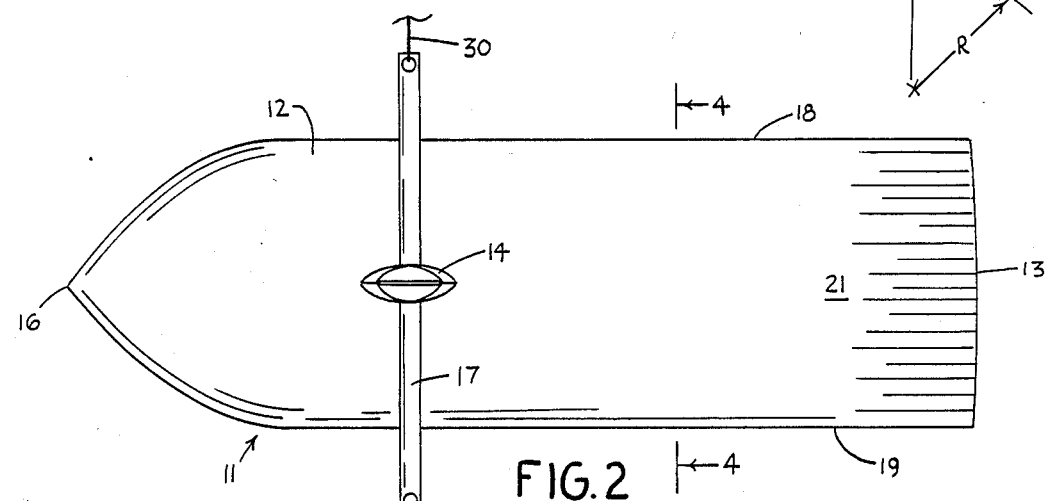
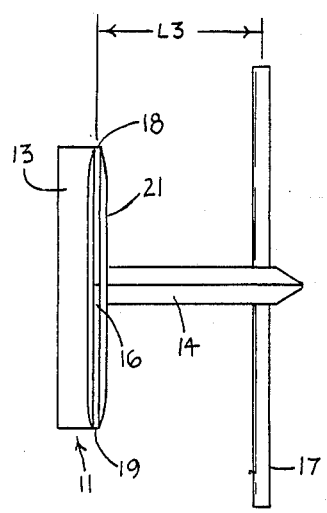
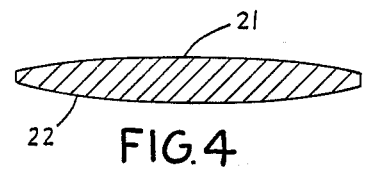
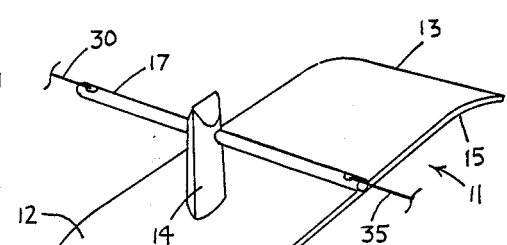
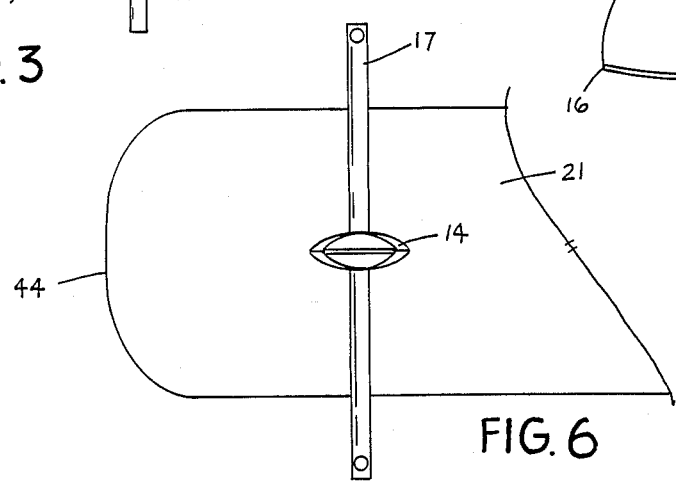

DOWNRIGGER CONTROL BOARD

BACKGROUND OF THE INVENTION

Many styles of sportsfishing involve a technique called trolling. In this form of sportsfishing, a fishing line rigged with either artificial or natural baits is trailed behind a moving boat or launch. A natural or artificial bait is moved through the water along with the moving boat in order to cover a large territory in a body of water and thereby improve the chances of encountering fish, either singly or in schools. Also, the artificial or natural bait is moved through the water using this trolling technique in order to cause the lure to move in a fashion which will attract foraging fish.

When using the trolling technique, a fishing rod and reel are normally used to extend fishing line for some distance into the water. The line which may be braided or monofilament line of various compositions is rigged with other equipment such as leaders, weights and the like. In the case where fabric lines are used to catch predatory fish having sharp teeth, a leader is frequently attached to the end of the line. Typically, an artificial bait or artificial lure is then attached to this leader so that if a fish strikes the lure, the sharp teeth of the striking fish will not sever the line before the fish can be brought to the boat by the angler.

Trolling is a fishing technique which is used extensively to fish at the surface of the water and also to fish much deeper for species of fish which normally forage at great depths in salt and freshwater bodies of water. Lake trout are an example of a freshwater species which forage at great depths which can range to 60 feet or more from the surface. Lake trout fishing using the trolling technique is frequently practiced on the Great Lakes, such as Lake Superior, Lake Michigan and in other deep, freshwater lakes.

A number of species of ocean fish such as marlin, shark, dolphin and similar species of fish are considered "deep sea" species which are likewise caught in relatively deep water. These species are frequently the subject of sportsfishing known as deep-sea fishing.

When the trolling technique is used for deep-sea fishing or for fishing lake trout and similar species of deep foraging fresh water fish, a device known as a downrigger is employed in order to sink the fishing lure to a depth where the particular fish species is foraging. This downrigger is essentially a winch, boom and pulley arrangement using a length of relatively strong line to which a heavy weight has been added. The downrigger normally employs a very strong rod and reel combination or a boom and winch which drops a strong line frequently made of copper wire to the depth desired. A heavy weight, frequently weighing as much as ten pounds, is attached to the downrigger line or cable to force the cable to the depth desired. The downrigger weight has a line release to which a fishing line having a lure is attached so that as the downrigger weight is lowered, it sinks the fishing line and lure to the depth where the deepwater fish are foraging.

Sportsfishing boats often use several downriggers to extend several fishing lines which, when dragged behind a moving boat, have a tendency to become entangled. This tendency to become entangled is apparent because there is a limited amount of room at the rear of a fishing boat for placing the fishing rigs in the water. Frequently, a boat will only employ two rods and reels when trolling. One is positioned at either corner of the rear of the boat. This limits the number of lures which can be trailed behind the fishing boat and thereby limits the opportunities for attractive foraging fish.

Limitations on the number of lures which can be trailed behind a boat places severe limitations on the number of clients which a fishing boat operator may place on board his boat for the purpose of enjoying deep-sea fishing If the number of lines used is too great, the lines will constantly become entangled and thereby reduce the enjoyment and opportunity for catching fish.

One technique to overcome this limitation on the number of lures trailed behind a trolling boat is to employ a rig mounted high on an elevated bridge of the boat. Elevated mounts hold additional lines away from lines which are extended from the rear of the boat. This technique is marginally successful since the lines connected to the rigging still tend to trail directly behind the boat when it is moving. Consequently, such rigging is still subject to entanglement. Such riggings normally do not tend to separate the trolling lures horizontally from each other in order to avoid entanglement. Consequently, there are severe limitations on the number of fishing lines which can be extended from a boat which is trolling for deep-water species of fish.

SUMMARY OF THE PRESENT INVENTION

In view of the shortcomings of certain of the prior art and in view of the space limitations imposed upon boat operators when using the trolling technique, tee current downrigger control board is designed to provide a device which will permit convenient employment of additional downrigger fishing rigs from a single boat and prevent entanglement of the individual trolling lines when deployed from the rear of a moving boat.

An object of the present invention is to provide a downrigger control board which is connected to a downrigger control cable between a downrigger windless and a downrigger weight to direct the downrigger cable away from the side of moving boat.

A further object of the present invention is to provide a downrigger control board having a curved tail portion which is connected between a downrigger assembly and a downrigger weight to direct the downrigger cable away from the side of the boat and carry the downrigger weight with it to direct a fishing line connected to a downrigger weight laterally away from the boat.

A further object of the present invention is to provide a downrigger control board having a body which is substantially planar in shape but with a curved tail portion designed to direct the board through the water at a distance from the side of a trolling boat when the board is connected to a downrigger control cable between the downrigger reel and a downrigger weight.

Yet another object of the present invention is to provide a downrigger control board having a substantially planar body but with a curved tail portion to direct the flow of water across the body and move the body having a mast and crossarm connected to a downrigger cable to direct the downrigger cable away from the side of a trolling boat to prevent entanglement of fishing lines which are connected to a downrigger weight attached to the control board.

Yet another object of the present invention is to provide a downrigger control board connected to a downrigger cable between a downrigger reel and a downrigger weight which also functions as a device for attracting the attention of deep-sea foraging fish to a lure which is connected to a line attached to the downrigger weight.

The foregoing features described in the summary herein provide for an apparatus for permitting multiple rod and reel trolling lines to be extended from the rear of a boat utilizing a trolling technique and avoid the entanglement of the fishing lures and lines during the process of trolling for and catching deep-sea foraging fish.

BRIEF DESCRIPTION OF THE DRAWINGS

The present invention will be further described hereinafter with reference to the accompanying drawings wherein:

FIG. 1 is a front view of a control board according to the present invention,

FIG. 2 is a top view of a control board illustrated in FIG. 1 of the drawings,

FIG. 3 is a left-end view of a downrigger control board illustrated in FIG. 2,

FIG. 4 is a cross-sectional view taken along line 4-4 of FIG. 2,

FIG. 5 is a perspective view of a downrigger control board shown in FIG. 1 of the drawings, FIG. 6 is a fractional view of an alternate embodiment of a nose portion for a control board.

DETAILED DESCRIPTION

Figure 7:
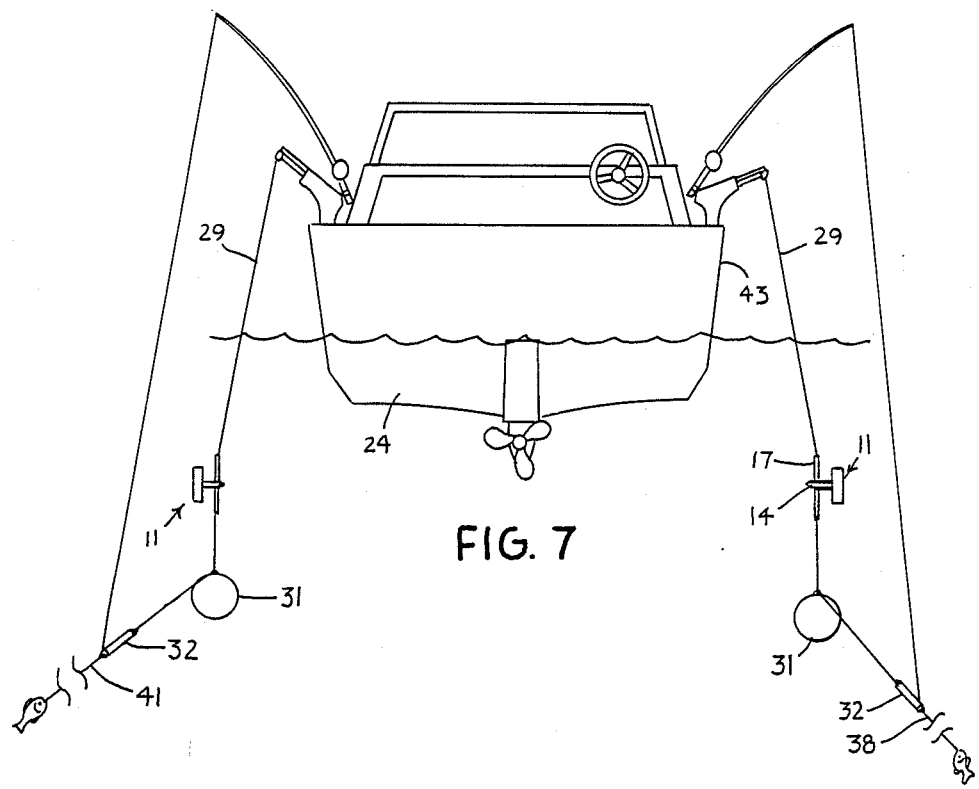
FIG. 7 is a rear view of a trolling boat employing a downrigger and control board.

Refer first to FIG. 1 of the drawings which is a front view illustrating a downrigger control board generally designated by the numeral 11. The control board 11 has a body 12 which lies in substantially a single plane but which has a tail portion 13 which substantially forms a curved extension from the planar body 12 of the control board 11. A mast 14 is positioned on planar body 12 intermediate the tail portion 13 and a nose portion 16 of the body 12.

Reference to FIGS. 2 and 3 of the drawings will reveal that mast 14 carries a crossarm 17 which is mounted in mast 14 opposite the body 12 and toward the top of mast 14. Mast 14 is positioned, as illustrated in FIG. 2 of the drawings, equal distances from sides 18 and 19 of the body 12 and is also positioned intermediate the tail portions 13 and 16. Note that mast 14 is positioned nearer the nose of body 12 than it is the tail portion 13 of body 12. This positioning of mast 14 i important and critical in the operation of the control board since its positioning at a relatively precise location between the nose portion 16 and the tail portion 13 determines the proper function of the control board 11 when it is used in connection with a downrigger fishing device Body 12 may have a cross-section of varying types, however. A preferred cross-sectional shape for the body 12 is illustrated in FIG. 4 of the drawings and is a view taken along line 4—4 of FIG. 2 of the drawings. This cross-sectional shape essentially illustrates a slightly curved top surface 21 and a slightly curved lower surface 22 to form the cross-sectional shape for body 12 illustrated in FIG. 4. This particular body shape permits efficient and easy flow of water across the surface of body 12 when the control board 11 is in operation.

Further, FIG. 2 of the drawings reveals that body 12 is substantially longer than it is wide so that the body 12 is essentially rectangular in shape except for the tapered nose portion 16.

The material from which body 12, mast 14 and crossarm 17 are constructed can vary widely. As an example, the body 12 and mast 14 can be constructed of a cast metal which is heavier than water such as aluminum. Heavier than water materials may be used. Further, other materials may also be utilized to construct the control board These materials might include a variety of plastics, wood, or other materials that are sturdy and can be utilized in much the same way that a rudder on a ship is utilized. The material choice is optional, but must b capable of being formed to create a curved extension 15 as part of tail portion 13. In a preferred embodiment, the curved extension 15 is an arc which has a radius R. This arc extends from the plane of the body 12 and curves in a direction away from top surface 21 where mast 14 is mounted.

The function of downrigger control board 11 is best illustrated by reference to FIGS. 7, 8 and 9 of the drawings in which the control board 11 is illustrated in operation. First, refer to FIG. 9 of the drawings. A downrigger assembly generally designated as numeral 23 is attached to a boat 24. The downrigger assembly 23 includes a boom 26 which is mounted on a base 27. A winch 28 is mounted on the base 27 and supplies downrigger cable 29 through a pulley 37. In the typical downrigger operation, cable 29 is directly connected to a downrigger weight 31. A fishing line release 32 is connected to the weight 31. Release 32 is a mechanism designed to be connected to fishing line 33. Line release 32 is designed to hold the fishing line 33 until a fish strikes the lure 34. Lure 34 can be any artificial or natural bait which is used by the fisherman to attract foraging fish of the type which is sought by the fisherman. Frequently, lure 34 will be attached to a leader 36 so that a fish striking the lure 34 will not sever the line 33 with sharp teeth. As soon as the fish strikes lure 34, the release 32 releases the line 33 so that the angler may battle the fish without interference from a heavy sinker connected to the fish line 33. The weight 31 acts as the weight for sinking the line 33 to the proper depth for attracting foraging fish at great depths in either saltwater or in freshwater bodies such as the Great Lakes. Weight 31 can frequently weigh as much as 10 pounds in order to ink the line 33, lure 34 and other apparatus connected to the fishing line to the proper depth.

Figure 8:
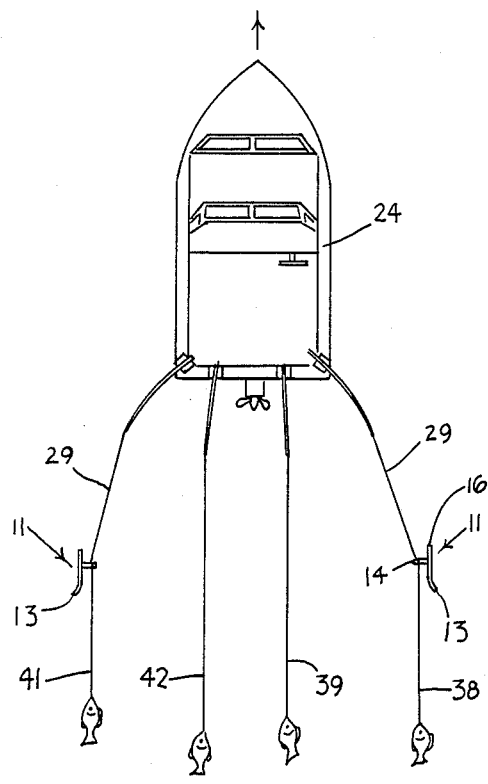
FIG. 8 is a top view of a boat moving through the water and trailing four trolling rigs, two of which employ a downrigger control board illustrated in FIG. 1 of the drawings.
Figure 9:
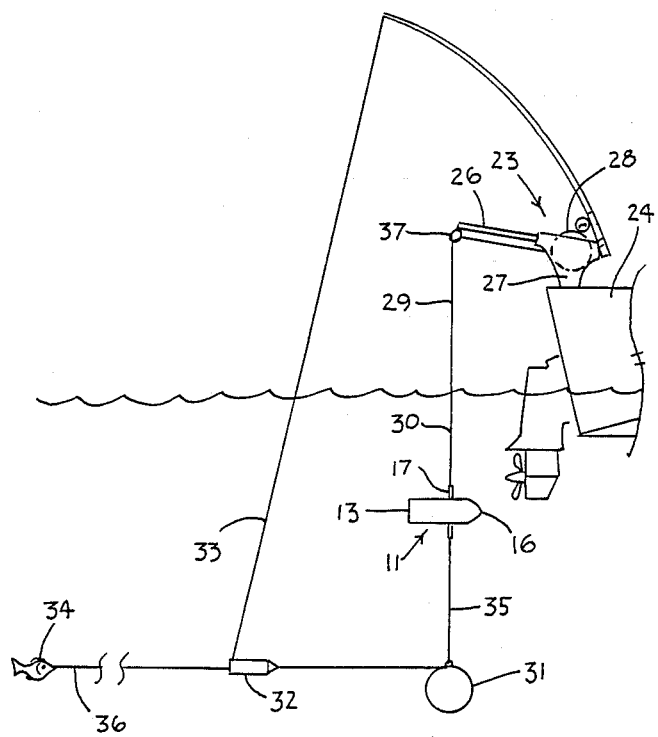
FIG. 9 is a fractional view illustrating a control board connected in a downrigger assembly and depicting the fishing rig connected to the downrigger.

It will be apparent from reference to FIG. 8 of the drawings that if numerous such lines are deployed from the boat 24, the numerous lines will potentially become entangled. Lateral separation of the lines is desirable in order to permit boat 24 to carry a larger number of lines or fisherman while trolling. The downrigger control board 11 functions as a device for producing lateral spread of the lines as illustrated in FIG. 8, in order to avoid entanglement of the multiple lines deployed from the back of the boat 24. Consequently, control board 11 is connected in the downrigger cable between a pulley 37 and the downrigger weight 31. A first side 30 of cable 29 from pulley 37 is connected to crossarm 17 and a second portion 35 of cable 29 is connected to the other end of crossarm 17 which is then in turn connected to the downrigger weight 31. The control board 11 is connected in cable 29 so that the curve or arc of tail portion 13 of the control board is curved away from the boat as illustrated in FIG. 8 of the drawings. When the control board 11 is thus positioned, the control board tends to carry cable 29 laterally away from the boat 24 and thus separate line 38 from the adjacent line 39. Likewise, on the other side of the boat, as illustrated in FIG. 8 of the drawings, a second downrigger control board 11 is connected in cable 29, but in this case, again, the downrigger tail portion 13 is positioned to curve away from the side of the boat 24. This positioning of downrigger 111 tends to direct the downrigger control board 11 outwardly from the side of the boat 24 and, thus, separate line 41 from line 42. In this way, the control board spreads the trolling lines 38 and 41 so that there is more distance between the various fishing lines. This prevents potential entanglement of the lines when the boat is proceeding in the arrow direction, but also provides a margin of safety when the boat makes a turn with the fishing lines deployed The distance that the downrigger control board 11 will pull the cable 29 laterally from the side of the boat 43 will be dependent upon a number of factors, including the weight of weight 31, the speed of the boat, the weight of the cable 29 and similar factors.

Refer, again, to FIG. 1 of the drawings The foregoing description of the function of control board 11 makes apparent the dependence of the function of the control board II of fluid flowing over the surface of body 12. Water flowing over the surface engages the curved tail portion 13 of the control board 11 and forces the nose portion 16 in a direction to carry the fishing gear away from the boat. Proper functioning of the control board 11 is achieved by location of mast 14 nearer the nose portion 16 of the body 12 than the tail portion 13. The distance depicted by length L1 is shorter than the length L2 as displayed in FIG. 1 of the drawings. In a preferred embodiment of the invention, utilizing a tapered nose portion 16, which is illustrated in FIG. 2 of the drawings, it has been found that the ratio of L1 to L2 should be about 0.57.

Referring to FIG. 3 of the drawings, the length L3 which is the distance between a center line of body 12 and the center line of crossarm 17 also has a relationship to the lengths L1 and L2 for proper operation of the control board. It has been found that the ratio of L3 to L2 is about 0.27.

Likewise, with the dimensions L1, L2, L3 having a relatively precise relationship in a preferred embodiment utilizing the torpedo-shaped nose portion as illustrated in FIG. 2 of the drawings, the radius R of the arc of the tail portion 15 also has a relationship to lengths L1, L2, and 33, and it has been found that a preferred relationship is a ratio of R to L2 of about 0.7.

These indicated ratios of L1, L2, L3, and R produce effective functioning of the control board 11 when a torpedo-shaped or tapered-shaped nose portion 16 is utilized as shown in FIG. 2 of the drawings. The ratio of L1 to L2 will vary somewhat if the nose portion 16 is changed in shape. FIG. 6 of the drawings illustrates a nose portion 44 which is not a bullet shape or tapered shape, but it is rather a simple rounded nose where the corners of a generally rectangular body shape have simply been rounded to form a substantially rounded nose portion 44. When the nose portion 44 is thus shaped, the distance L1 becomes somewhat less and length L2 becomes somewhat greater. Nevertheless, mast 14 is always positioned along the length of body 12, nearer the nose portion 14 than the tail portion 13.

It has been found that the indicated ratios may vary plus or minus about fifteen percent (15%) and still provide a proper operation of the control board Accordingly, it has been found that the ratios in about the range, as set forth in the following chart, are acceptable for operation of the control board 11 of varying nose shape.

$L1/L2 = 0.48$ to $0.65$
$L1/L3 = 1.7$ to $2.3$
$R/L2 = 0.6$ to $0.8$
$L3/L2 = 0.23$ to $0.32$.

By positioning the mast 14, along the length of the planer body 12, the mast 14 insures proper and smooth operation of the control board 11 when it is being pulled through the water by boat 24.

It will be apparent from the above description that control board 11 may be made in a variety of sizes. The important feature of the invention is that the relative positioning of the mast 14 along the length of the body be maintained within the indicated ratios so that the control board 11 will direct the downrigger weight and attached fishing line away from the boat 24.

In one preferred embodiment of the downrigger control board 11, the control board 11 was constructed to a size adequate to use for Great Lakes trolling for lake trout. In this embodiment, the control board 11 was constructed with a tapered or bullet-shaped nose portion 16 and operated satisfactory in deep water when the following dimensions were utilized in the construction.

$L1 = 4.125$ inches
$L2 = 7.187$ inches
$L3 = 2$ inches
$R = 5$ inches

A control board 11 constructed according to these dimensions might be cast from a metal such as aluminum and provides the further function of acting as an attractor for deep-foraging fish. It was found that the control board 11 acted somewhat like a spinner which apparently attracted fish to the fishing rig. The control board 11, constructed according to these dimensions and ratios, also provided adequate planing force to move the control cable 29 suspended from the downrigger assembly 23, away from the side of the boat, to provide adequate lateral space between multiple trolling rigs which were deployed from the rear of fishing boat 24.

The above description and specific illustrations of a preferred embodiment of invention are intended to illustrate the principles of the invention. Many variations of these sizes and features may be provided without departing from the spirit and scope of the invention. For instance, a multitude of different materials might be used to construct the control board 11. Various cross-sectional shapes may be used for the body 12 which will provide satisfactory function of the board 11. Further, no particular cross-sectional shape is necessary for mast 14; however, a tapered cross-section has been found to be useful in order to insure the smooth flow of water past the mast. A mast of circular cross-section would work effectively also. These and other variations in the design may be made without varying from the spirit and scope of the invention.

What is claimed is:

1. A downrigger control board for attachment to a downrigger cable which comprises a planar body, said body having a length substantially greater than a width of the body and with said body lying in substantially a single plane, said body having a nose portion and a tail portion, said tail portion forming a curved extension extending from the plane of said body, said tail portion being parallel to the plane of the body, a mast mounted on a first surface of said body between said nose and tail portion and positioned nearer said nose portion than said tail portion, and a cross arm mounted parallel to the plane of said body and out of contact with said body on said mast opposite said body and extending on both sides of said mast for engaging said downrigger cable.

2. A control board in accordance with claim 1 in which said nose portion is tapered.

3. A control board in accordance with claim 1 in which said control board is constructed of a material which is heavier than water.

4. A control board in accordance with claim 3 in which said control board is constructed of cast metal.

5. A control board in accordance with claim 3 in which said control board is constructed of cast aluminum.

6. A control board in accordance with claim 1 in which said curved extension is an arc.

7. A control board in accordance with claim 1 in which said curved extensions curves in a direction away from said first surface where said mast is mounted.

8. A downrigger control board for attachment to a downrigger cable which comprises, a planar body, said planar body having a length substantially greater than a width of the body and with said body lying in substantially a single plane, said body having a nose portion and a tail portion, said tail portion forming a curved extension extending from the plane of said body with the curve bending out of the plane of said body, said tail portion being parallel to the plane of the body, a mast mounted on a first surface of said body between said nose portion and said tall portion with the mast positioned a distance L1 from said nose portion and a distance L2 from said tail portion and in which the ratio of L1 to L2 is in the range from about 0.48 to about 0.65 and a cross arm mounted parallel to the plane of said body and out of contact with said body on said mast and extending on both sides of said mast for engaging said downrigger cable.

9. A control board in accordance with claim 8 in which said cross arm is mounted on said mast at a distance L3 from a center line of said planar body and in which the ratio of L3 to L2 is in the range from about 0.23 to about 0.32.

10. A control board in accordance with claim 8 in which the curved extension of said tail portion is an arc having a radius R and in which the ratio of R to L2 is in the range of about 0.6 to about 0.8.

11. A downrigger control board for attachment to a downrigger cable which comprises, a planar body, said planar body having a length substantially greater than a width of the body and with said body lying in substantially a single plane, said body having a nose portion and a tail portion, said tail portion forming an arc from the plan of said body with the arc bending out of the plane of said body and having a radius R, said tail portion being parallel to the plane of the body, a mast mounted on said body between said nose portion and said tail portion with the mast positioned a distance L1 from said nose portion and a distance L2 from said tail portion and in which the ratio of L1 to L2 is in the range from about 0.48 to about 0.65, and a cross arm mounted parallel to the plane of said body and out of contact with said body on said mast extending on both sides of said mast and mounted a distance of L3 from a center line of said body for engaging said downrigger cable and with the ratio of L1 to L2 in the range of about 0.48 to about 0.65, the ratio of L3 to L2 in the range of about 0.23 to about 0.32 and the ratio of R to L2 in the range of about 0.6 to about 0.8.

12. A downrigger control board for attachment to a downrigger cable which comprises, a planar body, said planar body having a length substantially greater than a width of the body and with said body lying in substantially a single plane, said body having a nose portion and a tail portion, said tail portion forming a of the plane of said body and having a radius R, said tail portion being parallel to the plane of the body, a mast mounted on said body between said nose portion and said tail portion with the mast positioned a distance L1 from said nose position and a distance L2 from said tail portion, a cross arm mounted parallel to the plane of said body and out of contact with said body on said mast extending on both sides of said mast and mounted a distance L3 from a center line of said body for engaging said downrigger cable, and with the ratio of L1 to L2 of about 0.57, the ratio of L3 to L2 of about 0.27 and the ratio of R to L2 of about 0.7.

13. A control board in accordance with claim 1 in which said mast is positioned perpendicular to the plane of said body.

14. A control board in accordance with claim 13 in which said cross arm is mounted on said mast with substantially equal portions of said cross arm extending from contact with said mast.

15. A downrigger control board for attachment to a downrigger cable which comprises, a body, said body having a length substantially greater than a width of the body and with said body having a plane surface, said body having a nose portion and a tail portion, said tail portion forming a curved extension extending away from said body, said tail portion being parallel to said plane surface, a mast mounted on a first surface of said body between said nose and tail portion being parallel to said plane surface, a mast mounted on a first surface of said body between said nose and tail portion and positioned nearer said nose portion than said tail portion, and a cross arm mounted parallel to said plane surface and out of contact with said body and extending on both sides of said mast on said mast opposite said body for engaging said downrigger cable.

* * * * *